US011636096B2

(12) United States Patent
Saba et al.

(10) Patent No.: US 11,636,096 B2
(45) Date of Patent: Apr. 25, 2023

(54) CUSTOM METADATA TAG INHERITANCE BASED ON A FILESYSTEM DIRECTORY TREE OR OBJECT STORAGE BUCKET

(71) Applicant: International Business Machines Corporation, Armonk, NY (US)

(72) Inventors: Raul E. Saba, Tucson, AZ (US); Joseph W. Dain, Vail, AZ (US); Theodore Timothy Harris, Jr., Tucson, AZ (US); Gregory T. Kishi, Oro Valley, AZ (US); Scott Brewer, Tucson, AZ (US); Sara Megan Coronado, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/863,148

(22) Filed: Apr. 30, 2020

(65) Prior Publication Data

US 2021/0342331 A1 Nov. 4, 2021

(51) Int. Cl.
*G06F 7/00* (2006.01)
*G06F 17/00* (2019.01)
*G06F 16/23* (2019.01)
*G06F 16/2455* (2019.01)
*G06Q 10/105* (2023.01)

(52) U.S. Cl.
CPC .... *G06F 16/2379* (2019.01); *G06F 16/24552* (2019.01); *G06Q 10/105* (2013.01)

(58) Field of Classification Search
None
See application file for complete search history.

(56) References Cited

U.S. PATENT DOCUMENTS

| 9,002,906 | B1 | 4/2015 | Rice et al. |
| 9,075,733 | B1 | 7/2015 | Feldman et al. |
| 2009/0089340 | A1 | 4/2009 | Ohr et al. |
| 2014/0181119 | A1* | 6/2014 | Chiueh ................ G06F 16/137 707/747 |
| 2016/0170844 | A1* | 6/2016 | Long ................... G06F 11/1469 707/679 |
| 2017/0024140 | A1 | 1/2017 | Shivanand et al. |
| 2018/0032540 | A1* | 2/2018 | Geldman .............. G06F 16/137 |

FOREIGN PATENT DOCUMENTS

CN 109739893 A 5/2019

OTHER PUBLICATIONS

International Search Report and Written Opinion dated Aug. 12, 2021 received in a corresponding foreign application, 9 pages.

(Continued)

*Primary Examiner* — Tuan A Pham
(74) *Attorney, Agent, or Firm* — Scully, Scott, Murphy & Presser, P.C.

(57) ABSTRACT

A method and/or system of managing metadata are disclosed that include connecting a source data storage system (DSS) that stores both data and metadata to a metadata management platform (MMP); scanning metadata records onto the MMP from the DSS; storing metadata attributes for at least one of the group consisting of directories and buckets on the DSS in a look-up table on the MMP; and adding updated metadata attributes to the look-up table on the MMP for each subsequent scan of the DSS.

17 Claims, 7 Drawing Sheets

(56) References Cited

OTHER PUBLICATIONS

Wang et al. "Gnothi: Separating Data and Metadata for Efficient and Available Storage Replication." USENIX ATC 2012, Jun. 13-15, 2012, 12 pages.
Amazon. "Amazon Simple Storage Service." http://docs.aws.amazon.com/AmazonS3/latest/API/RESTObjectCOPY.html. Mar. 1, 2006. 1548 pages. API Version #:Mar. 1, 2006.
Openstack. "Object Storage API." https://developer.openstack.org/api-ref/object-storage/. Accessed Apr. 29, 2020. 7 pages.

* cited by examiner

CUSTOM METADATA TAG INHERITANCE BASED ON A FILESYSTEM DIRECTORY TREE OR OBJECT STORAGE BUCKET

BACKGROUND

This disclosure relates generally to improved data management, organization, and storage, particularly in data processing and storage systems where large databases or large amounts of data are processed and stored. Specifically, the present disclosure relates to a system and method for storing, sorting, organizing, managing and searching data and metadata, preferably large data and metadata collections, in computerized environments.

The use of electronic data storage is widespread. The adoption of network storage and the relatively rapid increase in the amount of electronic data being created requires the organization, storage, and management of a large volume of electronic data. Storage facilities available to large computer systems allow users to store, update, and recall data from large collections of data. Users and organizations that deal with significant quantities of digital information often have difficulty managing and searching files in an efficient and intuitive manner. An inability to easily store, organize, search, locate, and mange documents and content can translate into significant inefficiencies and lost opportunities.

In order to make good use of computer resources, data should be organized intelligently to make the retrieval process efficient. Data can be collected and stored as files, and/or objects. Files and/or objects typically contain data and can also include metadata. Metadata is basically data about data. Metadata refers to any descriptive or identifying information in computer-processable form that is associated with particular content, data, or a data set. Generally speaking, content will have metadata that is relevant to a number of characteristics of the content and/or the overall content collection. Metadata tags or metadata attributes, also referred to as custom metadata tags or attributes, refers to any descriptive or identifying information, typically in computer-processable form, that is associated with particular metadata, and that is indicative of the actual information or the content included in various data storage systems and with which the metadata is associated. Files are typically stored and organized in a filesystem or database. Buckets are used to store objects, which includes data and metadata. A bucket is a logical unit of storage, for example in IBM Cloud Object Storage.

A number of different types of data structures may be used in a data processing and storage systems for storing, sorting, organizing, managing, searching, and locating data. These data structures include linked lists, hash tables, and tree structures. Tree structures, e.g., data trees, are often used as a technique for optimizing the number of operations that are performed to locate a particular item within an ordered data storage system or database. Generally associated with large collections of data in a data storage system or database is a directory, bucket, or index, which like the labels on the drawers and folders of a file cabinet, speeds retrieval by directing a search to the part of the database or data storage system containing the desired item. If the directory or bucket is large, another index, directory, or bucket may be built on top of it to speed retrieval further, and so on. The resulting hierarchy is referred to as a tree. And organizing data, files, and objects in a tree assists with searching for and locating data, files, or objects more efficiently.

Files, objects, and data can also be located by searching metadata. Users of databases, and in particular large databases, use metadata to search for files, objects, and data. Users want metadata, such as custom metadata tags, to be stored separately from the source storage system and want to be able to quickly and efficiently search the metadata independent of the source storage system. This is because searching on the metadata of the source storage system can be slow, has performance implications on the source storage system, and searchers must go to each source storage system separately to search the metadata.

Existing systems, however, do not permit custom metadata tags set at a directory in a source storage file system to be inherited when a file is created in the directory in the source storage systems where the custom metadata tags are stored separate from (e.g., not stored in-line with) the data on the source storage system. For example, where a source storage system stores metadata in-line with the data and the directory of the source storage filesystem has custom metadata tags set in the extended attributes, when a new file is created in a directory of the source storage filesystem, existing systems require the application or user to get the custom metadata tags from the higher level directory and apply it manually or programmatically to the newly created files in the directory. Existing systems also do not permit custom metadata tags set on a bucket level to be inherited when an object is created in the bucket where the custom metadata tags are stored separate from (not stored in-line with) the data on the source storage system. For example, where a source storage system stores metadata in-line with the data and the bucket of the source object storage system has custom metadata tags set in the extended attributes, when a source object is created in a bucket that has custom metadata tags already set, the user or application must read the tags from the source storage system and apply the tags to the newly created object.

SUMMARY

The summary of the disclosure is given to aid understanding of a data storage system, architectural structures of data storage systems, including metadata storage systems and their architectural structure, and method of storing, organizing, managing, and/or searching data and metadata residing on data storage systems and separate metadata storage systems, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the data storage system, the metadata storage system, their architectural structures, and their method of operation to achieve different effects.

Methods, techniques, processes, systems, and/or platforms are disclosed for managing metadata. In one or more embodiments methods, processes, and/or techniques of managing metadata are disclosed that include connecting a source data storage system (DSS) that stores both data and metadata to a metadata management platform (MMP); scanning metadata records onto the MMP from the DSS; storing metadata attributes for at least one of the group consisting of directories and buckets on the DSS in a look-up table on the MMP; and adding updated metadata attributes to the look-up table on the MMP for each subsequent scan of the DSS. In an aspect, the DSS stores the metadata separate from the data, and stores the metadata attributes in at least one of the group consisting of directories or buckets separate from the data. According to one or more embodiments, the MMP is separate from and external to the DSS and only metadata is stored on the MMP. The method further includes in an aspect scanning the metadata from all the files and all the directories from the DSS onto the MMP or scanning the metadata from all the objects and all the buckets from the DSS onto the MMP. The look-up table in an aspect includes a plurality of entries and each entry comprises at least one of the group consisting of a directory or bucket and its corresponding metadata attributes. Adding updates to the look-up table optionally includes adding one or more new metadata attributes in the look-up table to at least one of the group consisting of an existing directory or an existing bucket in the one or more of the plurality of entries in the look-up table. In a further aspect, adding updates to the look-up table includes adding one or more new entries to the look-up table.

The method optionally includes, in response to a file or object metadata record being scanned onto the MMP, inspecting a file path or an object path and extracting a directory or bucket from the file path or object path. In an aspect, the MMP inspects the file path and object path and extracts the directory or bucket. In response to extracting the directory or bucket from the file path or object path, the method in an embodiment includes performing a look up for the extracted directory or bucket in the look-up table. In response to the extracted directory or bucket matching an entry in the lookup table, applying any metadata attributes associated with the matching entry in the look-up table to the metadata record and storing the metadata record with the applied metadata attributes as an enhanced metadata record in the MMP having metadata attributes. In response to at least one of the group consisting of a file and an object being created on the connected DSS, the method can include pushing a notification containing the metadata for the at least one of the group consisting of a file and an object from the DSS to the MMP. In response to the notification being pushed to the MMP, the method in an aspect includes identifying the event type from the metadata as a create instruction for the at least one of the group consisting of the file and object. The method further can include inspecting at least one of the group consisting of the file path and the object path from the metadata pushed to the MMP and extracting from the at least one of the group consisting of the file path and object path a directory or a bucket corresponding to the at least one of the file and object created in the DSS. The method, in response to extracting the directory or bucket from the metadata pushed to the MMP, includes in one or more embodiments performing a lookup to determine if the extracted directory or bucket matches a directory or bucket in the look-up table, and in response to the extracted directory or bucket matching a directory or bucket in the look-up table, attaching the metadata attributes corresponding to the matching directory or bucket in the look-up table to the metadata record to form an enhanced metadata record in the MMP having metadata attributes. The enhanced metadata record having metadata attributes in an aspect is saved to the MMP.

A system for managing metadata that in one or more embodiments includes a metadata management platform (MMP) containing circuitry and logic, the MMP configured to connect to a data storage system (DSS) that stores data and metadata separate from the data and has metadata attributes set in at least one of the group consisting of a directory for a file system and a bucket for an object system. The MMP in one or more embodiments includes a database to store enhanced metadata records having metadata attributes, and a cache look-up table having a plurality of entries, each entry having at least one of the group consisting of a directory and a bucket and corresponding metadata attributes for the directory or bucket, wherein the MMP is configured to receive metadata records from the DSS and store metadata attributes from the at least one of the group consisting of a directory or a bucket in the look-up table on the MMP, and wherein the MMP is further configured to inspect the file path or object path in the metadata record for the file's directory or the object's bucket, perform a search in the look-up table for an entry with a matching directory or bucket, apply the metadata attributes to the metadata record from the entry in the look-up table with the matching directory or bucket to create an enhanced metadata record having metadata attributes, and save the enhanced metadata record in the database on the MMP. The MMP in an aspect is further configured to receive metadata records from a scan of the DSS and add updated metadata attributes to the look-up table on the MMP for each additional scan of the DSS. The MMP according to an embodiment is further configured to: in response to at least one of the group consisting of a file and an object being created on the DSS, receive a notification containing the metadata for the at least one of the group consisting of a file and an object; inspect at least one of the group consisting of the file path and the object path from the metadata in the notification received; extract from the at least one of the group consisting of the file path and the object path a directory or a bucket corresponding to the at least one of the file and object created on the DSS; and search the look-up table for an entry that matches the extracted directory or bucket. The MMP in a further aspect is configured to: determine if the extracted directory or bucket matches a directory or bucket in the look-up table; in response to the extracted directory or bucket matching a directory or bucket in one of the plurality of entries in the look-up table, attach the metadata attributes from the matched entry to the metadata record to form an enhanced metadata record; and save the enhanced metadata record in the database.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of data storage systems, data organizational and management structures, metadata storage and management systems and structures, data organizational trees, the processing, storing, organizing, managing, and/or searching for data and metadata in data storage systems and metadata storage systems, will be better understood when read in conjunction with the figures provided. Embodiments are provided in the figures for the purpose of illustrating aspects, features, and/or various embodiments of the data storage systems, data organizational and management structures, metadata storage and management systems, data organizational trees, the processing, storing, organizing, managing, and/or searching for data and metadata in data storage and organizational structures, but the claims should not be limited to the precise arrangement, structures, features, aspects, assemblies, sub-assemblies, systems, circuitry, embodiments, or devices shown, and the arrangements, structures, assemblies, sub-assemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1:
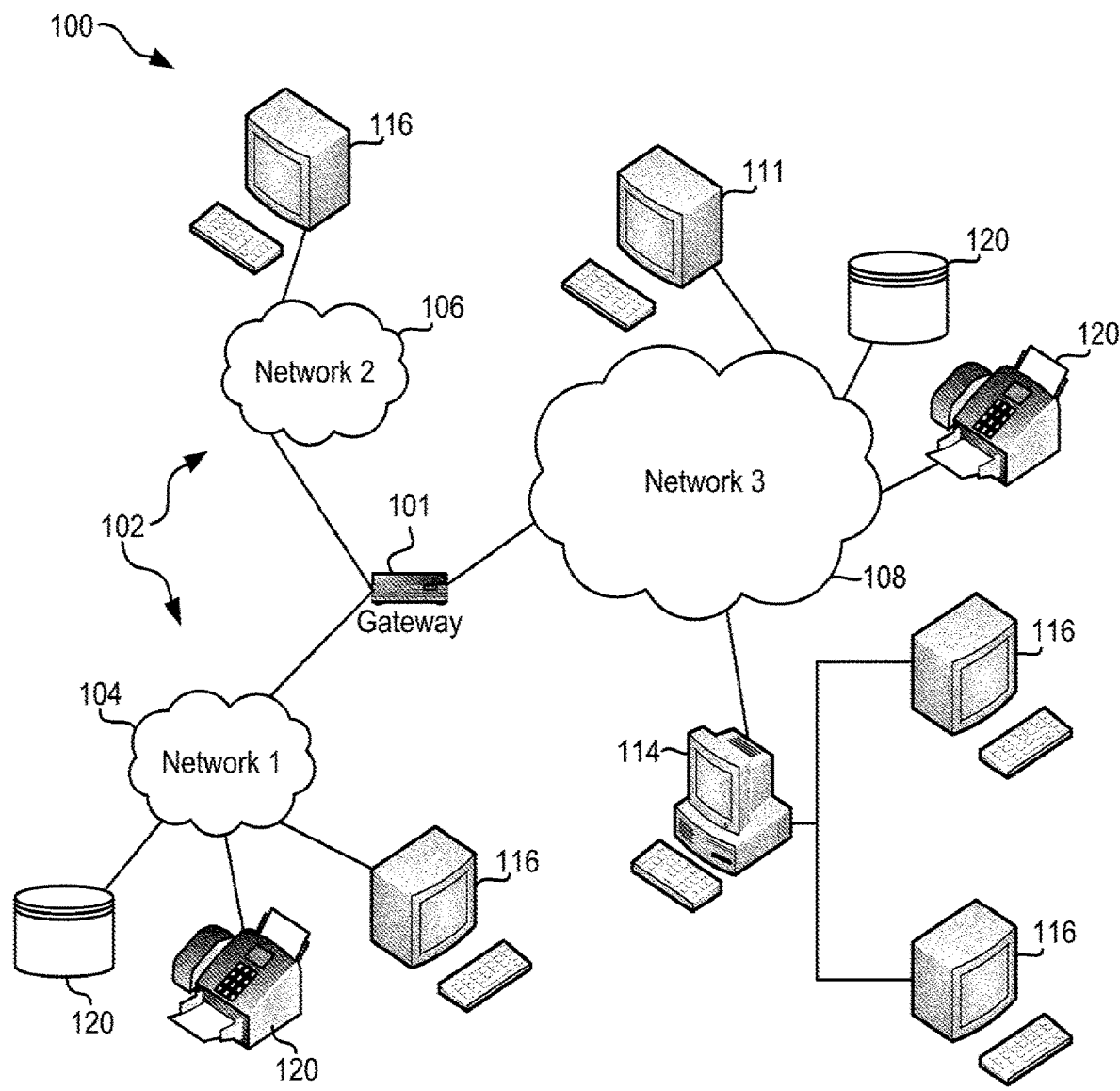
FIG. 1 depicts one example of a computing environment, according to an embodiment of the present disclosure.

The following description is made for illustrating the general principles of the invention and is not meant to limit the inventive concepts claimed herein. In the following detailed description, numerous details are set forth in order to provide an understanding of data storage systems, metadata storage and management systems, data and metadata organizational and management structures, data trees, the processing, storing, organizing, managing, and/or searching for data and metadata, however, it will be understood by those skilled in the art that different and numerous embodiments of the data storage system, metadata storage system, data and metadata organizational and management structures, data organization trees, the processing, storing, organizing, managing, and/or searching for data and metadata may be practiced without those specific details, and the claims and disclosure should not be limited to the embodiments, assemblies, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "content" or "data" means any computer-readable data including, but not limited to, digital photographs, digitized analog photos, music files, video clips, text documents, interactive programs, web pages, word processing documents, computer assisted design files, blueprints, flowcharts, invoices, database reports, database records, spread sheets, charts, tables, graphs, video game assets, sound samples, transaction log files, electronic documents, files which simply name other objects, and the like. The content may be organized and stored in the form of objects, files, records, blocks, or any other suitable format in one or more data storage systems, and can include files, objects, records, directories, indices, file system volumes, data blocks, buckets, extents, or any other hierarchies or organizations of data blocks. As used herein, a "data set" can refer to (1) any file that is or was addressable by a file system; (2) a subset of such a file (e.g., a data block); (3) any object that is or was addressable by a bucket; or (4) a subset of such an object. Data may include structured data (e.g., database files and objects), unstructured data (e.g., documents), and/or semi-structured data. Specifically, a data set can be a file, object, directory, bucket, block, share, volume, region within a volume, or an embedded object. Data sets can be complex, containing other embedded objects. For example, a file or object can be a container containing other files or objects, or a volume can have a file or object system on top of it which in turn contains files or objects. The system is capable of recognizing complex objects and tracking changes at finer embedded object granularity.

As used herein, the term "metadata" refers to any descriptive or identifying information in computer-process sable form that is associated with particular content, data, or a data set. Generally speaking, content will have metadata that is relevant to a number of characteristics of the content and/or the overall content collection, including, but not limited to, the content's technical aspects (format, bytes used, date of creation), the workflow in which the content participates (creator, owner, publisher, date of publication, copyright information, etc) and the subject matter of the content (the nature of the sound of an audio file, be it music or a sound-effect, the subject of a photograph or video clip, the abstract of a lengthy text document, excerpted particulars of invoices or other data-interchange format files). For example, metadata items may include but are not limited to one or more of the following: the content owner (e.g., the client or user that generates the content), the last modified time (e.g., the time of the most recent modification of a data set), a data set name (e.g., a file name), a data set size (e.g., number of bytes of data set), information about the content (e.g., an indication as to the existence of a particular search term), user-supplied or custom metadata tags, to/from information for email (e.g., an email sender, recipient, etc.), creation date, file type (e.g., format or application type), last accessed time, application type (e.g., type of application that generated the data block), location/network (e.g., a current, past or future location of the data set and network pathways to/from the data block), geographic location (e.g., GPS coordinates), frequency of change (e.g., a period in which the data set is modified), business unit (e.g., a group or department that generates, manages or is otherwise associated with the set), aging information (e.g., a schedule, such as a time period, in which the data set is migrated to secondary or long term storage), boot sectors, partition layouts, file location within a file folder directory structure, user permissions, owners, groups, access control lists (ACLS), system metadata (e.g., registry information), combinations of the same or the other similar information related to the data set.

The term "metadata tag", or "metadata attributes" (also referred to as custom metadata tags or attributes) refers to any descriptive or identifying information in computer-processable form that is associated with particular metadata, and that is indicative of the actual information or the content included in various data storage systems and with which the metadata is associated. A metadata tag is also referred to as metadata attributes.

The following discussion omits or only briefly describes conventional features of data storage systems and information processing systems, metadata storage and management systems, including data and metadata organizational and management structures, data trees, the processing, storing, organizing, managing, and/or searching for data and metadata, which are apparent to those skilled in the art. It is assumed that those skilled in the art are familiar with the general architecture of data storage systems, operations of data storage systems and/or operations on stored data, metadata storage systems, operations of metadata storage systems and/or operations on stored metadata, data and metadata organizational and management structures, data trees, the processing, storing, organizing, managing, and/or searching for data and metadata in data organization structures. It may be noted that a numbered element is numbered according to the figure in which the element is introduced, and is typically referred to by that number throughout succeeding figures.

A system and method for storing, organizing, sorting, managing, processing, and/or searching collections of data and metadata are disclosed. In one or more embodiments, systems, methods and techniques are disclosed for storing metadata from a source storage filesystem (SSF) into a separate metadata management system that is external to the SSF. The separate metadata management system can be used to search metadata independent of the SSF. In an embodiment, a system, method, and technique is disclosed to inherit custom metadata tags into a separate metadata storage and management system where custom metadata tags are set at a directory in a SSF when a file is created in the directory of the SSF. In an aspect, the system, method, and technique detects when a new file is created in a directory of the SSF where the directory has custom metadata tags or attributes set, and in response to detecting the creation of the new file in the SSF, the custom metadata tags of the newly created file in the metadata storage system is updated with the custom metadata tags set at the directory level in the SSF.

In another aspect, in one or more embodiments, a system, method, and technique is disclosed for storing metadata from a source object storage system (SOS) into a separate metadata management system that is external to the SOS. In an embodiment, a system, method, and technique is disclosed to inherit custom metadata tags into a separate metadata storage and management system where custom metadata tags are set on a bucket level in a SOS when an object is created in the bucket of the SOS. In an aspect, the system, method, and technique detects when an object is created in a bucket on the SOS where the bucket has custom metadata tags or attributes set, and in response to detecting the creation of a new object in the SOS, the custom metadata tags of the newly created object in the metadata storage system is updated with the custom metadata tags set at the bucket level in the SOS.

Turning to the environments in which the system, methods and techniques have potential application, FIG. 1 illustrates an architecture 100 of a computer network system, in accordance with an embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, smartphone, or any other type of logic device. It should be noted that in an embodiment a user device 111 may also be directly coupled to any of the networks.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
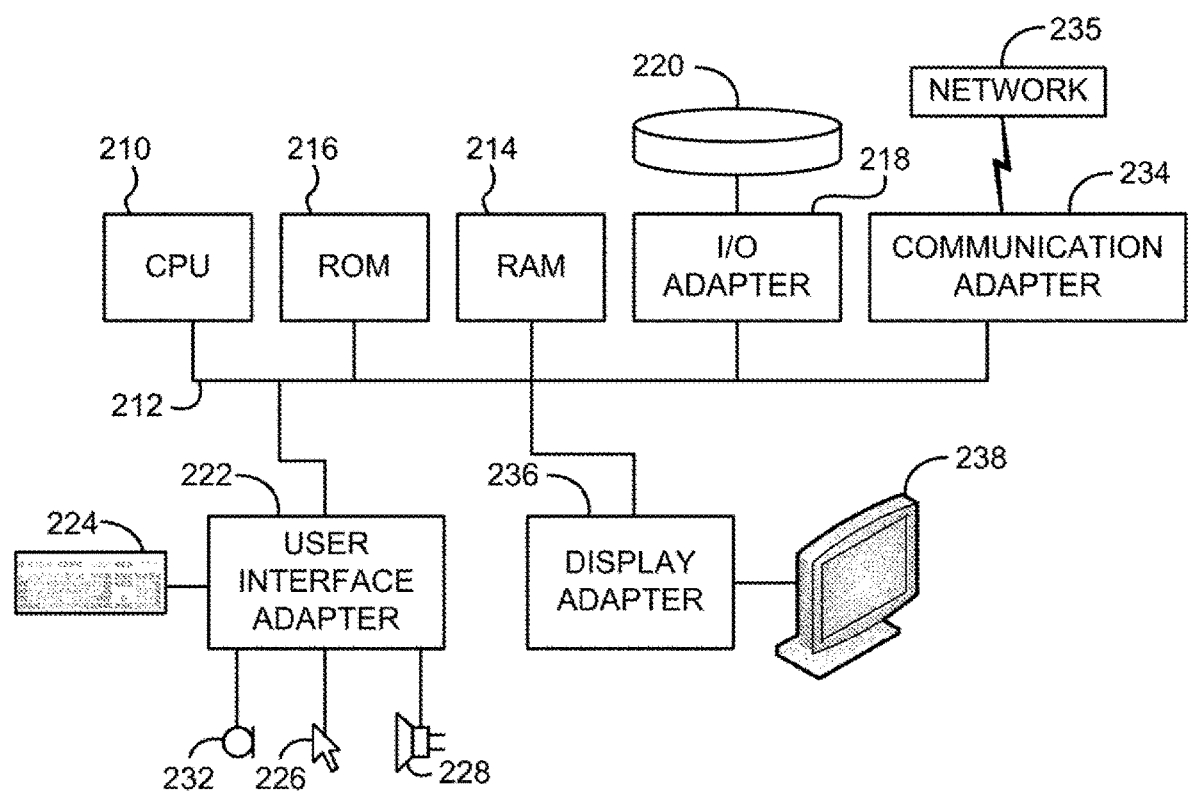
FIG. 2 is a functional block diagram illustrating a computer system, according to an embodiment of the present disclosure.

FIG. 2 shows a representative hardware environment associated with a user device 116 and/or server 114 of FIG. 1, in accordance with an embodiment. Such figure illustrates an example hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), MAC OS, UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
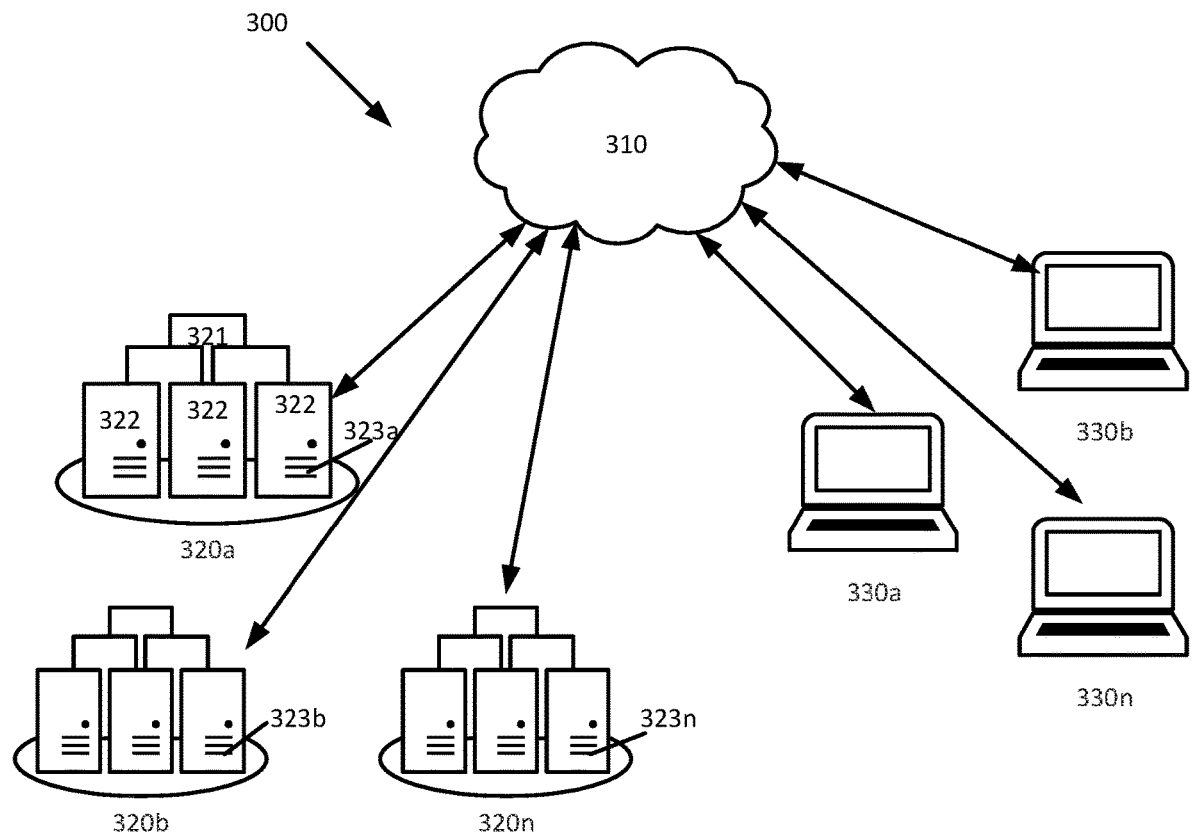
FIG. 3 depicts an example block diagram of an information and data storage/management system, according to an embodiment of the present disclosure.

Referring now to FIG. 3, there is illustrated an example block diagram of an information management system 300 that includes a set of networked data storage systems 320a, 320b . . . 320n and client devices 330a, 330b . . . 330n in communication via a data network 310 and in accordance with implementations of this disclosure. It can be appreciated that the implementations disclosed herein are not limited by the number of storage devices or data storage systems attached to data network 310. It can be further appreciated that storage devices or data storage systems attached to data network 310 are not limited by communication protocols, storage environment, physical location, etc.

In one embodiment, each data storage system 320a, 320b . . . 320n may include a storage subsystem 321 and storage devices 322. The storage subsystem 321 may comprise a storage server or an enterprise storage server, such as the IBM Enterprise Storage Server®. (IBM and Enterprise Storage Server are registered trademarks of IBM). The storage devices 322 may comprise storage systems known in the art, such as a Direct Access Storage Device (DASD), Just a Bunch of Disks (JBOD), a Redundant Array of Independent Disks (RAID), a virtualization device, tape storage, optical disk storage, or any other data storage system. The storage devices 322 may comprise content organized as object storage, file storage, and/or block storage. In certain embodiments, multiple storage subsystems may be implemented in one storage subsystem 321 and storage devices 322, or one storage subsystem may be implemented with one or more storage subsystems having attached storage devices.

In an embodiment, metadata corresponding to contents of the storage systems 320a, 320b . . . 320n is collected and stored. The metadata can be stored, organized, protected, managed, manipulated, moved, analyzed, and/or processed. Other types of information that generally provides insights into the contents of the storage systems 320a, 320b . . . 320n can also be stored.

In certain embodiments, client devices 330a, 330b . . . 330n may be general purpose computers having a plurality of components. These components may include a central processing unit (CPU), main memory, I/O devices, and data storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with a CPU and main memory is often referred to as a host system. The client devices 330a, 330b . . . 330n can have at least one operating system (e.g., Microsoft Windows, Mac OS X, iOS, IBM z/OS, Linux, other Unix-based operating systems, etc.) installed thereon, which may support or host one or more file systems and other applications.

The data storage systems 320a, 320b . . . 320n and client devices 330a, 330b . . . 330n communicate according to well-known protocols, such as the Network File System (NFS) or the Common Internet File System (CIFS) protocols, to make content stored on data storage systems 320a, 320b . . . 320n appear to users and/or application programs as though the content were stored locally on the client systems 330a, 330b . . . 330n. In a typical mode of operation, the client devices 330a, 330b . . . 330n transmit one or more input/output commands, such as an NFS or CIFS request, over the computer network 310 to the data storage systems 320a, 320b . . . 320n, which in turn issues an NFS or CIFS response containing the requested content over the network 310 to the respective client devices 330a, 330b . . . 330n.

The client devices 330a, 330b . . . 330n may execute (internally and/or externally) one or more applications, which generate and manipulate the content on the one or more data storage systems 320a, 320b . . . 320n. The applications generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on. The applications may also have the ability to access (e.g., read and write to) data storage systems 320a, 320b . . . 320n using a network file system protocol such as NFS or CIFS.

As shown, the data storage systems 320a, 320b . . . 320n, the client devices 330a, 330b . . . 330n, and other components in the information management system 300 can be connected to one another via a communication network 310. The communication network 310 can include one or more networks or other connection types including any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication network 310 in some cases may also include application programming interfaces (APIs) including, e.g., cloud service provider APIs, virtual machine management APIs, and hosted service provider APIs.

Figure 4:
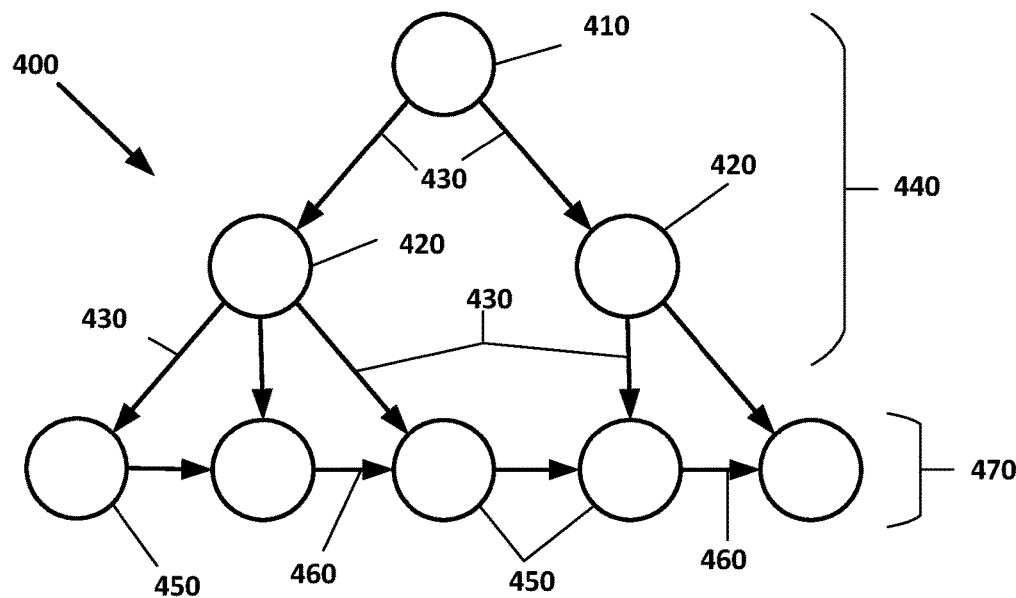
FIG. 4 is an example block diagram of a data tree structure, according to an embodiment of the present disclosure.

A number of different types of structures are used for storing, sorting, organizing, and managing data and metadata in data storage systems (and in metadata storage systems). Tree structures are one technique used to optimize the organization of, and ability to locate a particular item stored in, a large collection of data and information. There are a number of different tree structures for organizing data (including metadata) and its index or directory. A B-tree is one example of a tree for organizing data stored on a data storage system. A B-tree is a self-balancing tree data structure that maintains sorted data and allows searches, sequential access, insertions, and deletions in logarithmic time. A B-Tree has a root node, internal nodes, and leaf nodes. The root can be either a leaf node or an internal node. Nodes in a B-tree can have more than two children. The order or branching factor "d" of a B-Tree measures the capacity (i.e., the number of children nodes) of internal nodes in the tree. FIG. 4 illustrates an example B-tree 400 having a root node 410, internal nodes 420, and leaves 450. The nodes in tree 400 are illustrated as connected by pointers or references 430 and links 460. The lowest level 470 of the tree are leaf nodes 450 that are file or object containing nodes, and the upper levels or top portion 440 of the tree 400 comprising the internal nodes 420 and the root 410 do not contain any of the files or objects and are a directory or bucket (or index) to the leaf nodes 450.

Figure 5:
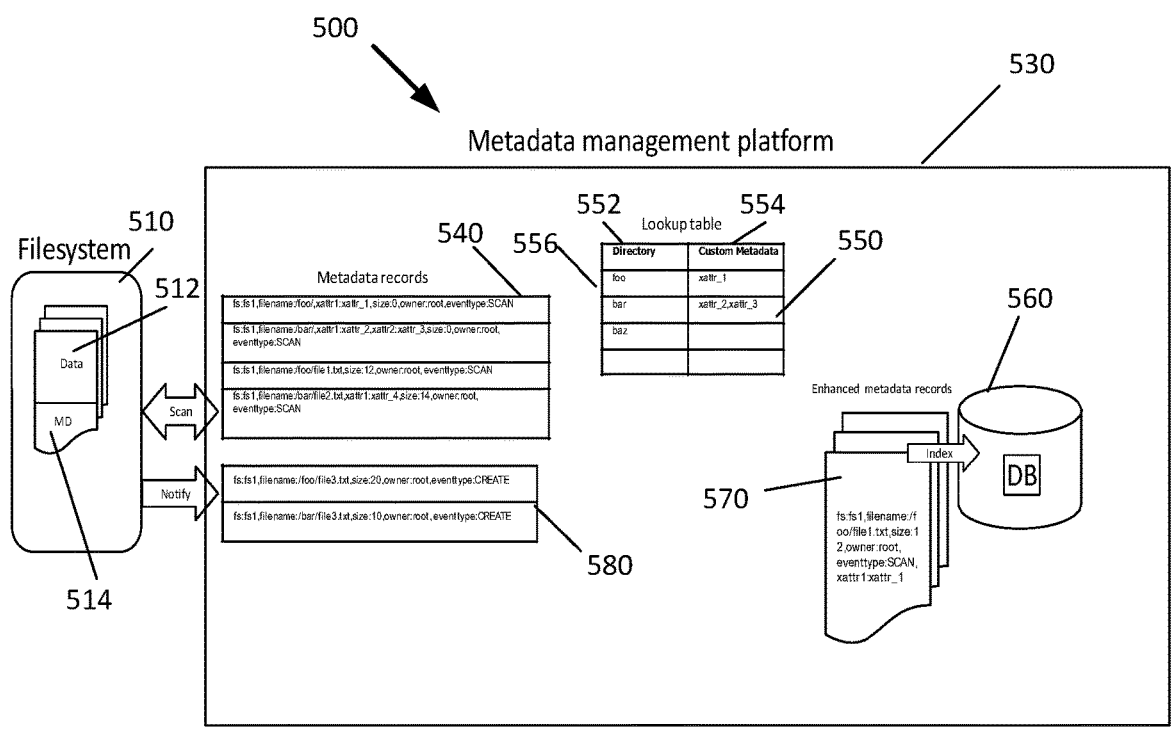
FIG. 5 is an example of a data storage filesystem storing data and metadata, and a separate, external metadata storage system.
Figure 6:
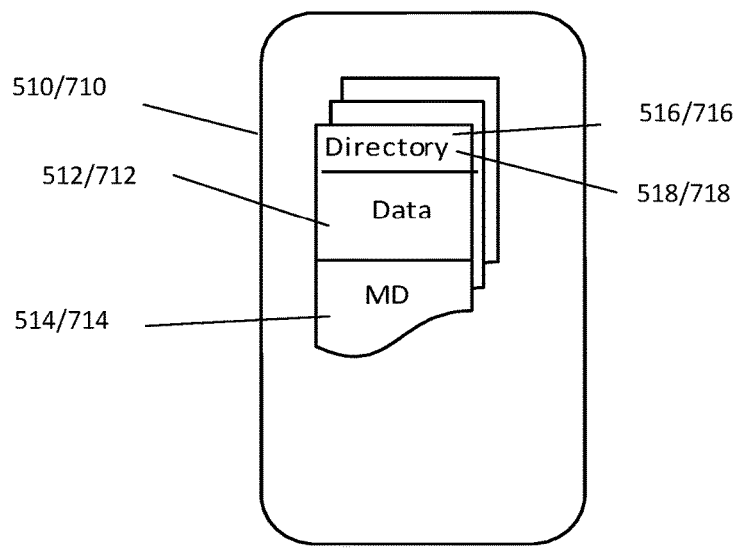
FIG. 6 is an example data storage system having a storage directory.

Referring to FIG. 5, an embodiment of a system 500 for managing metadata is illustrated having a source data storage system (DSS) 510 and metadata management system 530, also referred to as metadata management platform (MMP) 530. The metadata storage and management system 530 is external to and separate from the source data storage system 510. Source data storage system 510 is a source storage filesystem (SSF) 510 and contains both data 512 (e.g., data files) and metadata 514, and has a file directory 516 as illustrated in FIG. 6. The file directory 516 in one or more embodiments has custom metadata tags or metadata attributes 518 active or set. In an embodiment, the custom metadata tags 518 are stored separate from the data 512 (e.g., the files) on the SSF 510. That is, the custom metadata tags 518 are not stored in-line with the data (files) 512 on the SSF 510.

The metadata management system 530 contains metadata records 540, a lookup table 550, and database 560 containing enhanced metadata records 570. The system 500 permits custom metadata tags set at a directory level in a source file system (SSF) to be inherited by, e.g., applied to, the newly created metadata file in the separate metadata management system 530 when a file is created in the directory of the (SSF). The system 500 has this ability in one or more embodiments where the custom metadata tags are not stored inline with the data, e.g., the custom metadata tags are stored separate from the data, on the SSF. The metadata management system 530 preferably maintains a lookup table 550 for each filesystem. The metadata look-up table 550 preferably is a cache structure and has a directory column 552 that identifies the file system directories, and a custom metadata attributes or metadata tag column 554 that identifies the custom metadata attributes or custom metadata tags 518 for the corresponding directory. Each row or entry 556 corresponds to a single directory and its associated custom metadata attributes or tags. The look-up table 550 resides on the same system as the external metadata index, e.g., the MMP 530.

In operation a connection is established between the SSF 510 and the metadata management platform (MMP) 530. The MMP 530 initiates a scan of the attached SSF 510 and captures system metadata from the files and directories of the SSF 510. The scan of SSF 510 in one or more embodiments captures the metadata for all the files and directories in the SSF 510 and creates metadata records 540. The custom metadata attributes or tags in the directories on the SSF 510 are captured by the scan and saved (cached) in the look-up table 550 on the MMP 530. Scans of the SSF 510 to capture the source metadata from the SSF files and directories can be initiated on demand, set-up to repeat on a scheduled or recurring basis, or set-up to initiate according to a triggering event, e.g., a volume or amount of data added to the SSF since the last scan. For each subsequent scan, the look-up table 550 is refreshed and updated. Any new custom metadata tags or attributes 518 added to the existing directories in the SSF 510 are added to the look-up table 550 in the MMP 530. Any new directories and their associated custom metadata tags or attributes 518 added to the SSF 510 since the last scan also will be added to the look-up table 550 in the MMP 530.

During the scan of the SSF 510, as files are ingested the MMP 530, in one or more embodiments, inspects the file path in the metadata record 540, and obtains the file's directory. The MMP 530 in an aspect performs a lookup of the file's directory obtained from the file path in the look-up table 550. If there is a match (hit) in the look-up table 550, e.g., the look-up is successful, then any custom metadata tags or attributes associated with the matching directory in the look-up table 550 are attached to the metadata records 540 to be indexed in the database 560. The metadata records 540 with the attached custom metadata tags are enhanced metadata records 570, and the enhanced metadata records 570 are then indexed in the database 560 on the MMP 530. An unsuccessful look-up of the file's directory in the look-up table 550 indicates the directory custom metadata tags 518 have not yet been scanned by the MMP 530 and captured in the look-up table 550 on the MMP 530.

A reconciliation policy can be run in cases where a look-up or search during record ingestion is unsuccessful, meaning the directory does not have an associated entry in the look-up table 550 because the information has not yet been indexed into the lookup table 550. Upon the row being added to the lookup table 550, the subset of records in the metadata management system index that have a matching directory with the custom metadata tags would be updated. A reconciliation policy also can be run in cases where a directory entry is updated with new metadata so that the custom metadata tag update is applied to those files within the directory that have already been indexed in the metadata management system 530. Upon an update to a row or set of rows in the look up table 550, the subset of records 570 in the metadata management system index that have a matching directory with the updated metadata tags would be updated.

In an aspect, as files are created in the SSF 510, which is connected or attached to the MMP 530, the SSF 510 pushes a notification containing the SSF metadata 580 from the SSF 510 into the MMP 530. The MMP 530 identifies the event type from the metadata 580 pushed into the MMP 530 as a file that was created. The file path in the metadata record 580 is inspected to extract the file's directory, and the MMP 530 performs a look-up (search) in the look-up table 550 for the directory extracted from the metadata 580. If the search for the extracted directory in the look-up table is successful, e.g., there is a matching entry (hit) in the look-up table 550, then any custom metadata tags or attributes associated with the matching directory from the look-up table 550 are attached to the metadata records to form enhanced metadata records 570, and that enhanced metadata record 570 is indexed and stored in the database 560 in MMP 530.

Figure 7:
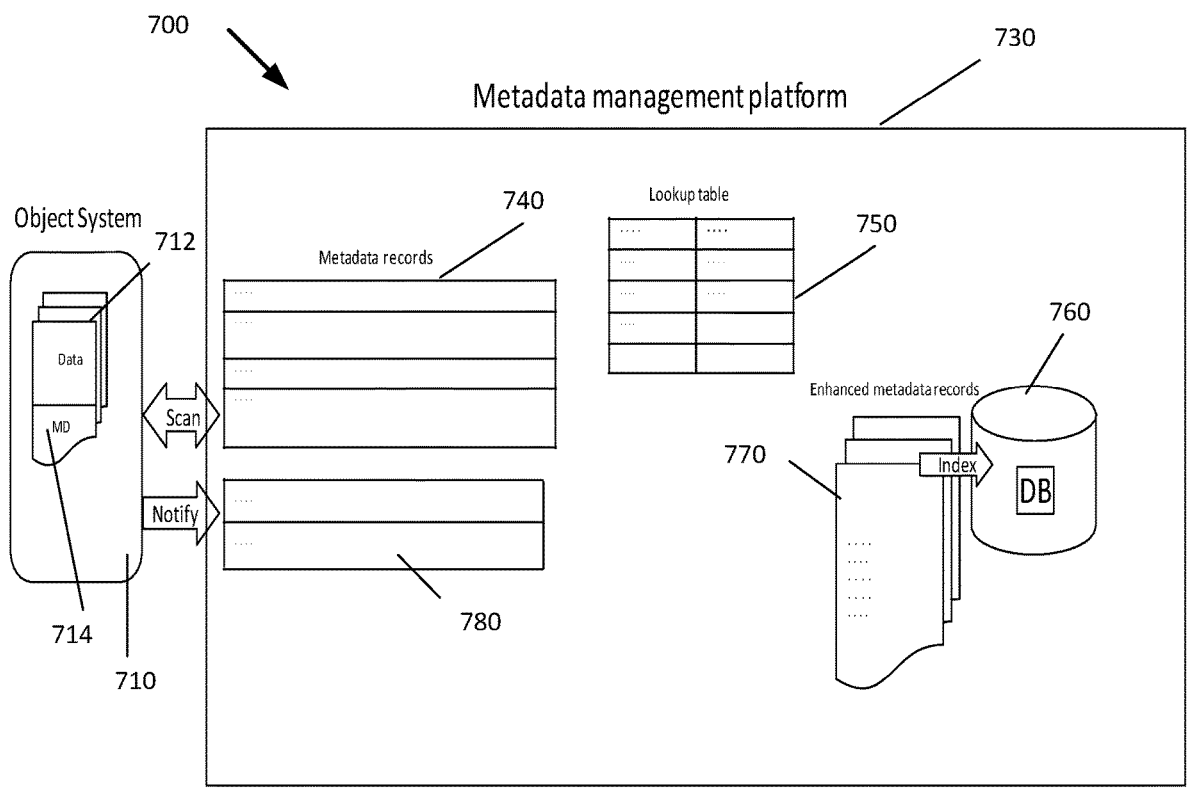
FIG. 7 is an example of a data storage object system storing data and metadata, and a separate, external metadata storage system.

Referring to FIG. 7, an embodiment of a system 700 for managing metadata is illustrated having a source data storage system 710 and metadata management system 730, also referred to as metadata management platform (MMP) 730. The metadata storage and management system 730 is external to and separate from the source data storage system 710. Source data storage system 710 in FIG. 7 is a source storage object system (SOS) 710 and contains both data 712 (e.g., objects) and metadata 714, and has a bucket 716 as illustrated in FIG. 6. The bucket 716 in one or more embodiments has custom metadata tags or attributes 718 active or set (FIG. 6). In an embodiment, the custom metadata tags 718 are stored separate from the data 712 (e.g., the objects) on the SOS 710. That is, the custom metadata tags 718 are not stored in-line with the data (objects) 712 on the SOS 710.

The metadata management system 730 contains metadata records 740, a lookup table 750, and data base 760 containing enhanced metadata records 770. The system 700 permits custom metadata tags set at a bucket level in a source storage object system (SOS) to be inherited e.g., applied to, the newly created metadata record in the separate metadata management system 530 when an object is created in the bucket of a SOS. The system 700 has this ability in one or more embodiments where the custom metadata tags are not stored inline with the data (objects), e.g., the custom metadata tags are stored separate from the data, on the SOS. The metadata management system 730 preferably maintains a look-up table 750 for each object system. The metadata look-up table 750 preferably is a cache structure and has a bucket column 752 that identifies the object system buckets, and a custom metadata attributes or tag column 754 that identifies the custom metadata attributes or custom metadata tags 718 for the corresponding bucket. Each row or entry 756 corresponds to a single bucket and its associated custom metadata attributes or tags. The look-up table 750 resides on the same system as the external metadata index, e.g., the memory management system or platform 730.

In operation a connection is established between the SOS 710 and the metadata management platform (MMP) 730. The MMP 730 initiates a scan of the attached SOS 710 and captures system metadata from the objects and buckets of the SOS 710. The scan of SOS 710 in one or more embodiments captures the metadata for all the objects and buckets in the SOS 710 and creates metadata records 740. The custom metadata attributes or tags in the directories on the SOS 710 are captured by the scan and saved (cached) in the look-up table 750 on the MMP 730. Scans of the SOS 710 to capture the SOS metadata from the SOS objects and buckets can be initiated on demand, set-up to repeat on a scheduled or recurring basis, or set-up to initiate according to a triggering event, e.g., a volume or amount of data added to the SOS since the last scan. For each subsequent scan, the look-up table 750 is refreshed and updated. Any new custom metadata tags or attributes 718 added to the existing buckets in the SOS 710 are added to the look-up table 750 in MMP 730. Any new buckets and their associated custom metadata tags or attributes 718 added to the SOS 710 since the last scan will be added to the look-up table 750 in the MMP 730.

During the scan of the SOS 710, as objects are ingested the MMP 730 in one or more embodiments, inspects the object path in the metadata record 740, and obtains or extracts the object's bucket. The MMP 730 in an aspect performs a lookup of the object's bucket in the look-up table 750. If there is a match (hit) in the look-up table 750, e.g., the look-up is successful, then any custom metadata tags or attributes associated with the matching bucket in the look-up table 750 are attached to the metadata records 740. The metadata records 740 with the attached custom metadata tags are enhanced metadata records 770, and the enhanced metadata records 770 are preferably indexed and stored in the database 760 on the MMP 730. An unsuccessful look-up of the file's bucket in the look-up table 750 indicates the bucket custom metadata tags 718 have not yet been scanned by the MMP 730 and captured in the look-up table 750 on the MMP 730.

A reconciliation policy can be run in cases where a look-up or search during record ingestion is unsuccessful, meaning the bucket does not have an associated entry in the look-up table 550 because the information has not yet been indexed into the lookup table 550. Upon the row being added to the lookup table 550, the subset of records in the metadata management system index that have a matching bucket with the custom metadata tags would be updated. A reconciliation policy also can be run in cases where a bucket entry is updated with new metadata so that the custom metadata tag update is applied to those objects within the bucket that have already been indexed in the metadata management system 530. Upon an update to a row or set of rows in the look-up table 550, the subset of records 570 in the metadata management system index that have a matching bucket with the updated metadata tags would be updated.

In an aspect, as objects are created in the SOS 710, which is connected or attached to the external MMP 730, the SOS 710 pushes a notification containing the metadata records 780 from the SOS 710 into the MMP 730. The MMP 730 identifies the event type from the metadata pushed into the MMP 730 as an object that was created. The file path in the metadata record 780 is inspected to extract the bucket, and the MMP 730 performs a look-up (search) in the look-up table 750 for the object's bucket extracted from the metadata record 780. If the search for the extracted bucket in the look-up table is successful, e.g., there is a matching entry (hit) in the look-up table 750, then any custom metadata tags or attributes associated with the matching bucket from the look-up table 750 are attached to the metadata records to form enhanced metadata records 770, and that enhanced metadata record 770 is preferably indexed and stored in the database 760 in MMP 730.

The system and method in one or more embodiments, without user intervention or assistance, detects when a file or object is created in a directory or bucket that has custom metadata attributes or tags set, and attaches the custom metadata attributes or tags to the newly created file or object in the index external metadata storage and management system.

Figure 8:
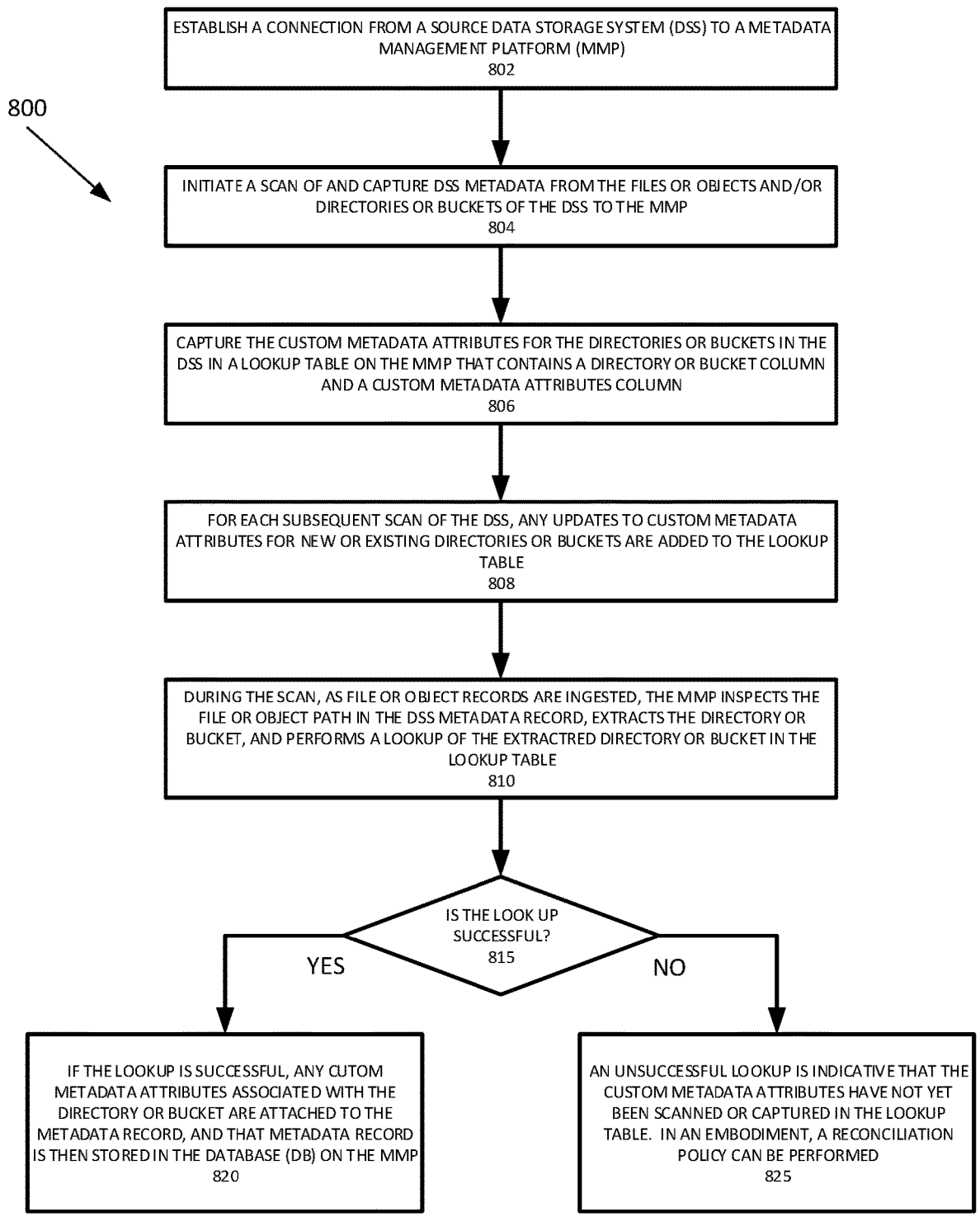
FIG. 8 is an exemplary flowchart illustrating a method of scanning metadata including custom metadata tags into an external metadata management system separate from a data storage system that stores inline both data and metadata.

Referring now to FIG. 8, an exemplary flowchart in accordance with various embodiments illustrating and describing a method of copying or scanning metadata from a source data storage system (DSS) to a separate external metadata storage and management system, and preferably attaching any custom metadata tags or attributes to newly created metadata records in the metadata storage system. While the method 800 shown in FIG. 8 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8 but the process may be integrated and/or one or more steps may be performed together, simultaneously, or the steps may be performed in the order disclosed or in an alternate order, unless indicated otherwise.

At 802 in method 800, a connection is established between a source data storage system (DSS) and a metadata management platform or system. A scan of the DSS, preferably by the metadata management platform (MMP), at 804, captures the metadata from the files or objects and/or directories or buckets of the SSF onto the MMP. The scan of the DSS preferably captures the metadata for all the files and directories in the source storage filesystem (SSF), or all the objects and buckets in the source storage object system (SOS). The metadata captured on the MMP creates and or forms metadata records. The scan of the directories or buckets on the DSS by the MMP captures any custom metadata tags or attributes that are set for the directories or buckets on the DSS. The custom metadata tags or attributes captured by the scan of the DSS directories or buckets at 806 are stored in a lookup table on the MMP. The look-up table in one or more embodiments contains a directory or bucket column and a custom metadata attributes or tag column. The MMP in an embodiment has and maintains a look-up table for each data system whose metadata is saved to the external MMP.

In an aspect, for each subsequent scan of the DSS, any updates to custom metadata tags or attributes for new or existing directories or buckets in the DSS, at 808 are added to the lookup table. For example, if during a subsequent scan, a new custom metadata tag or attribute is added to an existing directory or bucket in the DSS, the new tag is added to the lookup table for that directory or bucket. As a further example, if during a subsequent scan, a new directory or bucket is added to the DSS, then the new directory or bucket (and its corresponding custom metadata tags or attributes) is added to the lookup table. At 810, as files or objects from the DSS are ingested into the MMP, the MMP inspects the file or object path in the metadata record to obtain or extract the file's directory or the object's bucket, and with the extracted file's directory or object's bucket performs a lookup or search in the lookup table for a matching directory or bucket. At 815 it is determined whether the search in the look-up table is successful. In other words, at 815 it is determined whether there is a hit or a matching directory or bucket in the look-up table. If the search in the lookup table is successful (815: YES), then at 820, any custom metadata tags or attributes associated with the matching directory or bucket from the lookup table are attached to the metadata record to form an enhanced metadata record. The enhanced metadata records at 820 are also indexed and stored in the database on the MMP. In one or more embodiments, the custom metadata tags can be used to search the enhanced metadata records in the MMP independent of the DSS.

If the search in the lookup table for the directory or bucket obtained from the metadata file or object path is unsuccessful (815: No), it means that the custom metadata attributes have not been scanned and captured in the lookup table. In the scenario, where the search in the lookup table is unsuccessful, in an embodiment at 825 a reconciliation policy can be performed or implemented. In an aspect, the reconciliation policy implemented can add a row to the lookup table, and in a further aspect can update the subset of records in the index of the MMP that have a matching directory or bucket with the custom metadata tag. An alternative or additional reconciliation policy can be implemented in cases where a directory or bucket entry is updated with new metadata so that the update to the custom metadata tag is applied to those associated files within the directory or objects within the bucket that have already been indexed and stored in the MMP database. Upon an update to a row or set of rows in the lookup table, the subset of records indexed and saved in the MMP database that have a matching directory or bucket would be updated with the updated custom metadata tags, unless indicated otherwise.

Figure 9:
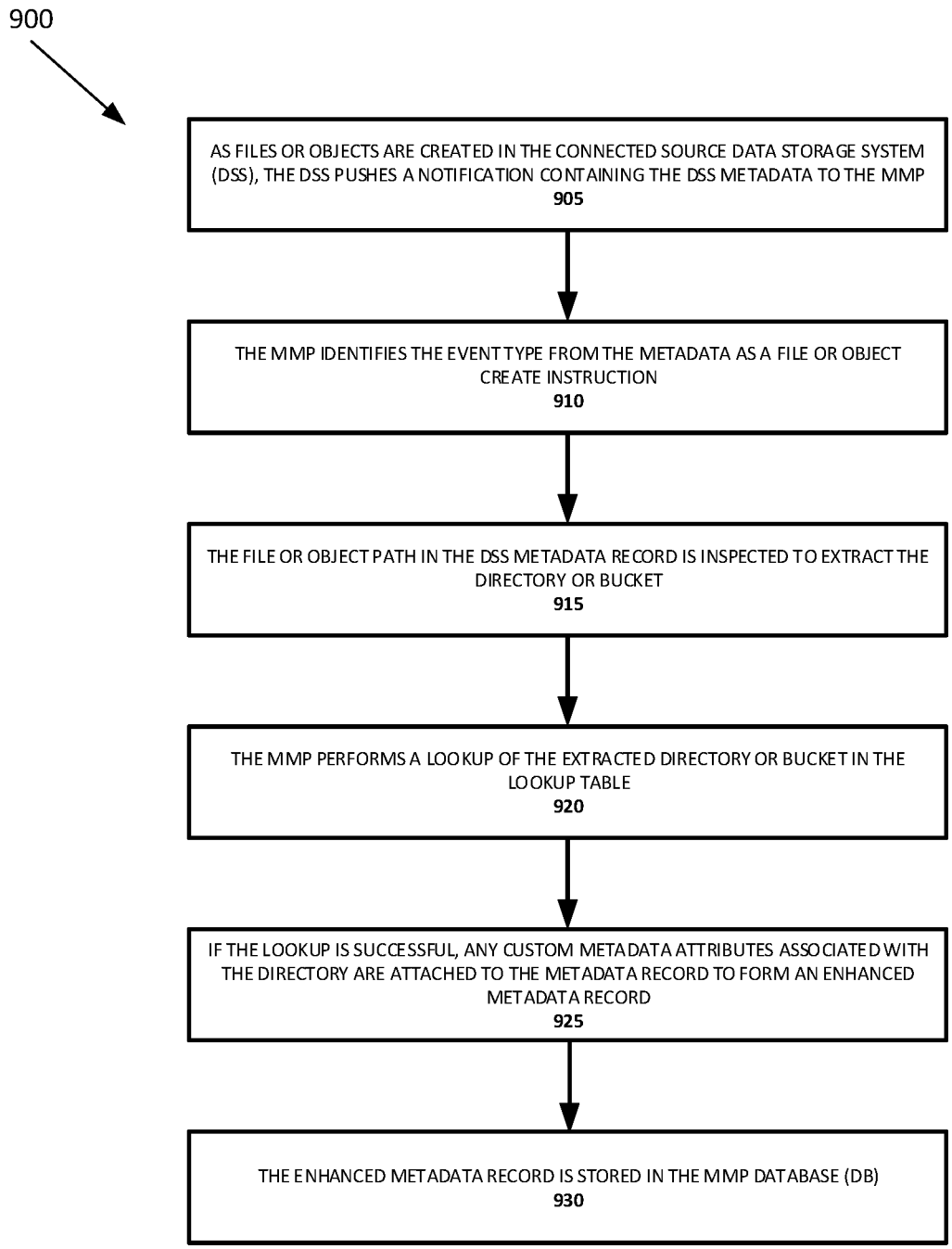
FIG. 9 is an exemplary flowchart illustrating and describing a method of storing custom metadata tags to a metadata management system that is separate and external to a data storage system.

Referring now to FIG. 9, an exemplary flowchart in accordance with various embodiments illustrating and describing a method of applying custom metadata tags or attributes to a newly created file or object indexed and stored in an external metadata database when a file or object is created in a directory or bucket of a source data storage system (DSS) that has custom metadata tags or attributes set. While the method 900 shown in FIG. 9 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9 but the process may be integrated and/or one or more steps may be performed together, simultaneously, or the steps may be performed in the order disclosed or in an alternate order.

In method 900, as files or objects are created in a source data storage system (DSS) connected to an external metadata management platform (MMP), at 905 the DSS pushes a notification containing the metadata of the DSS to the MMP. The DSS in one or more embodiments has custom metadata tags or attributes set in the directory or bucket, and in one or more embodiments, the custom metadata tags or attributes are not stored inline with the data on the DSS. At 910 the MMP identifies the event type from the metadata pushed to the MMP as a file or object create instruction. The file or object path of the metadata record is inspected at 915, preferably by the MMP, to obtain or extract the directory or bucket information/identification. With the extracted directory or bucket, the MMP performs a look up or search of the lookup table for a matching directory or bucket at 920. If the lookup with the extracted directory or bucket matches an entry in the lookup table, e.g., there is a hit in the lookup table, then at 925 any custom metadata tags or attributes associated with the matching directory or bucket are attached or applied to the metadata record, forming an enhanced metadata record. At 930 that enhanced metadata record is indexed and stored in the MMP database. In one or more embodiments, the custom metadata tags can be used to search and locate the enhanced metadata records in the MMP independent of the DSS.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 8-9, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

In one or more embodiments a computer program product is disclosed. The computer program product can be embodied on one or more computer-readable media and include programming instructions that when executed cause a processor to: (a) receive metadata records from a data storage system (DSS) to a metadata management platform (MMP); (b) store metadata attributes from at least one of the group consisting of a directory or a bucket in a look-up table on the MMP; (c) inspect the file path or object path in the metadata record for the file's directory or the object's bucket; (d) perform a search in the look-up table for an entry with a matching directory or bucket; (e) apply the metadata attributes to the metadata record from the entry in the look-up table with the matching directory or bucket to create an enhanced metadata record having metadata attributes; and (f) save the enhanced metadata record in the database on the MMP. It will be appreciated that the instructions can cause the processor to operate in the order stated or an alternative order, and can include alternative or additional instructions.

The computer program product in one or more aspects further includes programming instructions that when executed cause a processor to: receive metadata records from a scan of the DSS; and add updated metadata attributes to the look-up table on the MMP for each additional scan of the DSS. In a further embodiment, the computer program product can additionally or alternatively include programming instructions that when executed cause a processor to: in response to at least one of the group consisting of a file and an object being created on the DSS, receive a notification containing the metadata for the at least one of the group consisting of a file and an object; inspect at least one of the group consisting of the file path and the object path from the metadata in the notification received; extract from the at least one of the group consisting of the file path and the object path a directory or a bucket corresponding to the at least one of the file and object created on the DSS; and search the look-up table for an entry that matches the extracted directory or bucket. Optionally, in one or more embodiments, the computer program product can further include programming instructions that when executed cause a processor to: determine if the extracted directory or bucket matches a directory or bucket in the look-up table; in response to the extracted directory or bucket matching a directory or bucket in one of the plurality of entries in the look-up table, attach the metadata attributes from the matched entry to the metadata record to form an enhanced metadata record; and save the enhanced metadata record in the database.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

There are a number of different data storage systems that store objects in buckets including for example IBM Cloud Object storage, OpenStack Swift, and Amazon S3. For object storage, for example in, Amazon S3, and OpenStack Swift, the PUT or API call would be used to detect a newly created object in a bucket. For example, for object storage, the Spectrum Discover metadata platform is separate from and external to the source object storage system (SOS) and a PUT or POST REST API call creates the object in the bucket. In one or more embodiments, the metadata platform of the present disclosure, the PUT or POST REST API call is used and custom metadata tags from the object bucket are added to the object in the metadata storage system or MMP (database). In an embodiment with Amazon S3, the metadata storage platform (MMP) is notified of a PUT or POST API call that is used to create the object in the bucket by the storage object system (SOS), and the MMP would apply the custom metadata tags from the object bucket to the object in the MMP database. In another embodiment with OpenStack Swift, the metadata storage platform (MMP) is notified of a PUT or POST API call that is used to create an object in the bucket by the storage object system (SOS), and the metadata storage platform (MMP) applies custom metadata tags from the object bucket to the object in the metadata storage system (MMP) database. In another embodiment for file systems, a virtual file system (VFS) layer in the source data storage file system would detect the create command and notify the metadata management platform (MMP) of the create command. For example, in Spectrum Discover, a VFS layer in the source data storage file system would detect the create command and notify the metadata storage system (Spectrum Discover instance) that is decoupled from the source data storage file system of the create command from which in an embodiment, the custom metadata tags are applied to the metadata records according to one or more embodiments disclosed above.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing electronic metadata comprising:
providing a metadata management platform (MMP);
connecting the MMP to a separate and external source data storage system (DSS) that stores both electronic data and electronic metadata and the DSS stores the electronic metadata separate from the electronic data and stores electronic metadata attributes in at least one of a group consisting of directories separate from the electronic data and buckets separate from the electronic data;
scanning each electronic metadata record onto the MMP from the DSS, wherein scanning each electronic metadata record onto the MMP from the DSS includes storing each electronic metadata record onto the MMP;
inspecting by the MMP, in response to scanning an electronic metadata record onto the MMP, a file path or an object path of the electronic metadata record and extracting a directory from a file path or a bucket from an object path;
performing, in response to extracting the directory from the file path or the bucket from the object path, a look up for the extracted directory or bucket in a look-up table, wherein the look-up table comprises a plurality of entries and each entry comprises at least one of a group consisting of a directory and a bucket and corresponding electronic metadata attributes;
applying, in response to the extracted directory or bucket matching an entry in the lookup table, any electronic metadata attributes associated with the matching entry in the look-up table to the electronic metadata record and storing in the MMP the electronic metadata record with the applied electronic metadata attributes;
storing, in response to the extracted directory or bucket not matching an entry in the lookup table, the electronic metadata attributes for the extracted directory or bucket in the look-up table on the MMP;
storing, in response to the extracted directory or bucket not matching an entry in the lookup table, the electronic metadata record and applying the associated electronic metadata attributes to the electronic record; and
adding, in response to the extracted directory or bucket not matching an entry in the lookup table, updated electronic metadata attributes to the look-up table on the MMP.

2. The method of claim 1, wherein scanning electronic metadata records comprises scanning the electronic metadata from all the files and all the directories from the DSS onto the MMP or scanning the electronic metadata from all the objects and all the buckets from the DSS onto the MMP.

3. The method of claim 1, wherein adding updated electronic metadata attributes to the look-up table comprises adding one or more new electronic metadata attributes in the look-up table to at least one of the group consisting of an existing directory or an existing bucket in the one or more of the plurality of entries in the look-up table.

4. The method of claim 1, wherein adding updated electronic metadata attributes to the look-up table comprises adding one or more new entries to the look-up table.

5. The method of claim 1, further comprising, in response to at least one of the group consisting of a file and an object being created on the connected DSS, pushing a notification containing the electronic metadata for the at least one of the group consisting of a file and an object from the DSS to the MMP.

6. The method of claim 5, further comprising, in response to the notification being pushed to the MMP, identifying the event type from the electronic metadata as a create instruction for the at least one of the group consisting of the file and object.

7. The method of claim 5, further comprising inspecting at least one of the group consisting of the file path and the object path from the electronic metadata pushed to the MMP and extracting from the at least one of the group consisting of the file path and object path a directory or a bucket corresponding to the at least one of the file and object created in the DSS.

8. The method of claim 7, further comprising, in response to extracting the directory or bucket from the electronic metadata pushed to the MMP, performing a lookup to determine if the extracted directory or bucket matches a directory or bucket in the look-up table, and in response to the extracted directory or bucket matching a directory or bucket in the look-up table, applying the electronic metadata attributes corresponding to the matching directory or bucket in the look-up table to the electronic metadata record to form an enhanced electronic metadata record in the MMP having electronic metadata attributes.

9. The method of claim 8, further comprising saving the enhanced electronic metadata record having electronic metadata attributes in the MMP.

10. A method of managing electronic metadata comprising:
providing a metadata management platform (MMP);
connecting the MMP to a separate and external source data storage system (DSS) that stores electronic records having both electronic data and electronic metadata where the DSS stores the electronic metadata separate from the electronic data and stores electronic metadata attributes in at least one of a group consisting of directories separate from the electronic data and buckets separate from the electronic data;
scanning the electronic records on the DSS, wherein the scan of the electronic records includes the electronic metadata and the electronic metadata attributes including custom metadata attributes;
capturing and storing the electronic metadata from each of the electronic records scanned from the DSS as electronic metadata records on the MMP, wherein no electronic data from the electronic records on the DSS is captured and stored on the MMP;
inspecting by the MMP, in response to capturing and storing the electronic metadata from each of the scanned electronic records from the DSS as electronic metadata records on the MMP, a file path or an object path in the electronic metadata record on the MMP and extracting a directory from the file path or a bucket from the object path;
performing, in response to extracting the directory from the file path or the bucket from the object path, a look up for the extracted directory or bucket in a look-up table, wherein the look-up table comprises a plurality of entries and each entry comprises a directory and a bucket and corresponding electronic metadata;
storing, in response to the extracted directory or bucket not matching an entry in the look-up table, any electronic metadata attributes associated with electronic metadata record in the lookup table and associating and storing the electronic metadata attributes with the electronic metadata record on the MMP; and applying, in response to the extracted directory or bucket matching an entry in the lookup table, any electronic metadata attributes associated with the matching entry in the look-up table to the electronic metadata record and storing in the MMP the electronic metadata record with the applied electronic metadata attributes as an enhanced electronic metadata record having electronic metadata attributes.

11. The method of claim 10, wherein scanning electronic metadata records comprises scanning the electronic metadata from all the files and all the directories from the DSS onto the MMP or scanning the electronic metadata from all the objects and all the buckets from the DSS onto the MMP.

12. The method of claim 10, wherein adding updated electronic metadata attributes to the look-up table comprises adding one or more new electronic metadata attributes in the look-up table to at least one of the group consisting of an existing directory or an existing bucket in the one or more of the plurality of entries in the look-up table.

13. The method of claim 10, wherein adding updated electronic metadata attributes to the look-up table comprises adding one or more new entries to the look-up table.

14. The method of claim 10, further comprising, in response to at least one of the group consisting of a file and an object being created on the connected DSS, pushing a notification containing the electronic metadata for the at least one of the group consisting of a file and an object from the DSS to the MMP.

15. The method of claim 14, further comprising, in response to the notification being pushed to the MMP, identifying the event type from the electronic metadata as a create instruction for the at least one of the group consisting of the file and object.

16. The method of claim 14, further comprising inspecting at least one of the group consisting of the file path and the object path from the electronic metadata pushed to the MMP and extracting from the at least one of the group consisting of the file path and object path a directory or a bucket corresponding to the at least one of the file and object created in the DSS.

17. The method of claim 16, further comprising, in response to extracting the directory or bucket from the electronic metadata pushed to the MMP, performing a lookup to determine if the extracted directory or bucket matches a directory or bucket in the look-up table, and in response to the extracted directory or bucket matching a directory or bucket in the look-up table, applying the electronic metadata attributes corresponding to the matching directory or bucket in the look-up table to the electronic metadata record to form the enhanced electronic metadata record in the MMP having electronic metadata attributes.

* * * * *